E. A. SCHADE.
MITER BOX SAW SUPPORT.
APPLICATION FILED FEB. 27, 1909.
935,694.
Patented Oct. 5, 1909.
2 SHEETS—SHEET 2.
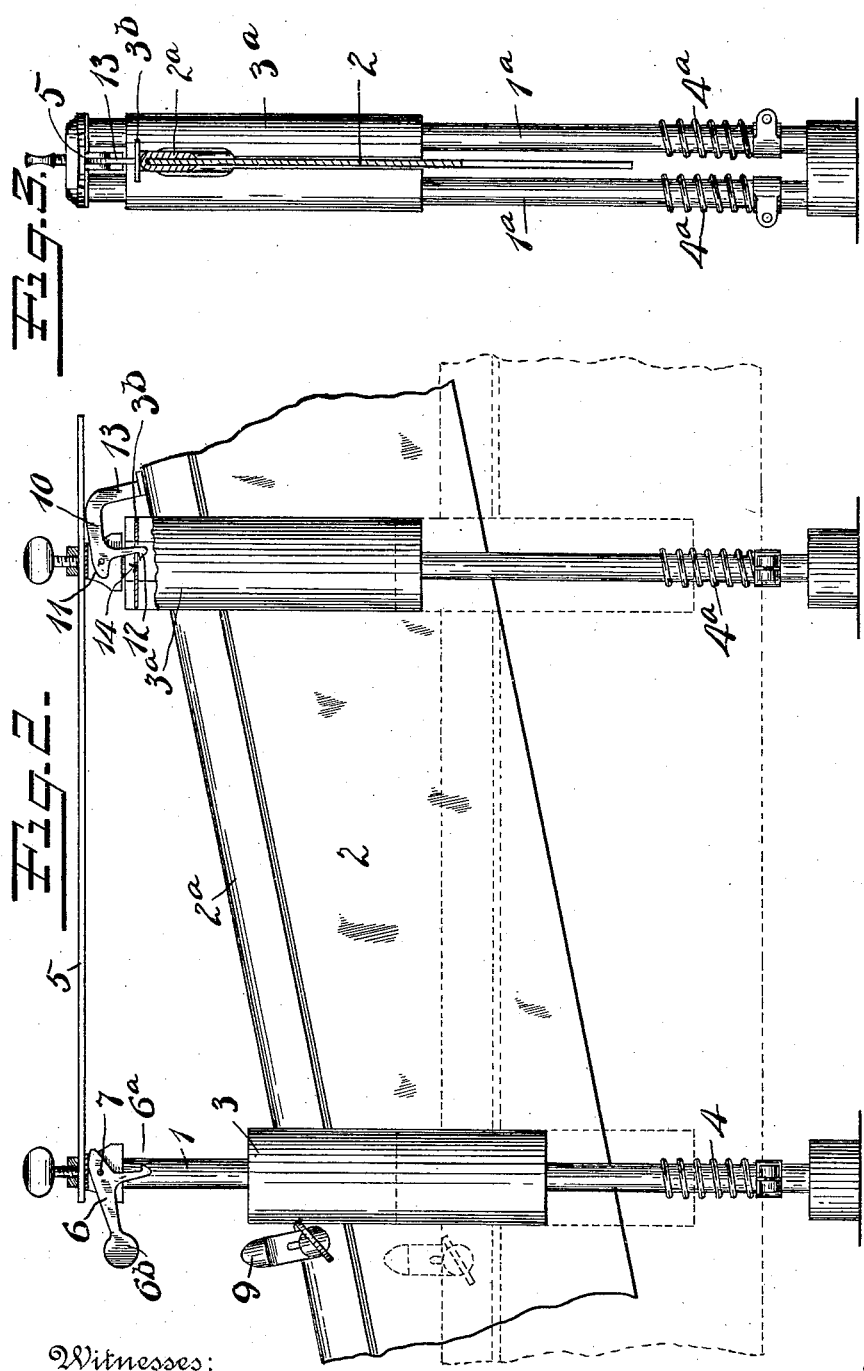

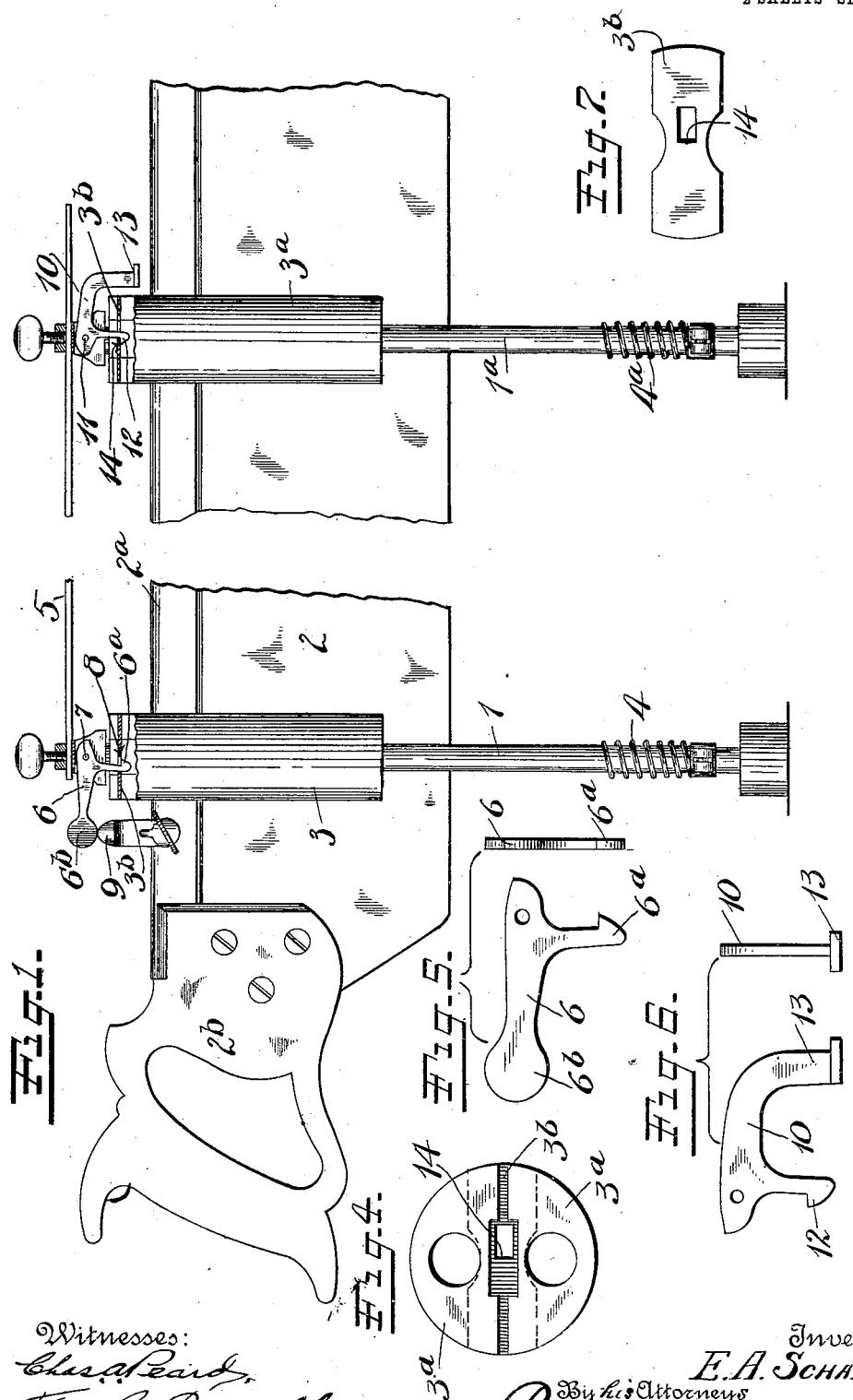

UNITED STATES PATENT OFFICE.

EDMUND A. SCHADE, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

MITER-BOX SAW-SUPPORT.

935,694. Specification of Letters Patent. Patented Oct. 5, 1909.

Application filed February 27, 1909. Serial No. 480,460.

*To all whom it may concern:*

Be it known that I, EDMUND A. SCHADE, a citizen of the United States, residing at New Britain, county of Hartford, State of Connecticut, have invented certain new and useful Improvements in Miter-Box Saw-Supports, of which the following is a full, clear, and exact description.

My invention relates to certain new and useful improvements in miter boxes, said invention relating particularly to an improved support for the saw, whereby said saw may be held elevated while the work is being placed in the box preparatory to cutting. The first advance movement of the saw automatically releases the saw supporting mechanism, allowing it to fall to a position where the work of sawing may be performed.

In the accompanying drawings, Figure 1 is a side elevation of the saw guides and carriers such as employed on a miter box, the miter box itself being of any approved form and hence not illustrated herein. In this figure the saw and saw carriers are illustrated in their elevated position, one of the supporting latches having just been disengaged to permit that end of the saw to drop to the position illustrated in the next figure. Fig. 2 is a similar view showing the saw just after it has been released by one of the latches and in the act of releasing the second latch, whereby both ends of the saw may descend to perform the work. Fig. 3 is an end view of Fig. 2, looking from right to left, the saw being shown in section. Fig. 4 is a relatively enlarged plan view of the top of one of the carriers. Fig. 5 is a detail illustration of one of the latches illustrating the same in side and end elevation. Fig. 6 is a similar illustration of the other latch. Fig. 7 is a plan view of another detail.

1—1$^a$ represent guide posts, usually provided in pairs, as shown in Fig. 3, and between which the saw 2 is located so as to move up and down and to and fro. The saw 2 is provided with the usual reinforced back 2$^a$.

3—3$^a$ represent what I term carriers which are slidably mounted upon the guide rods 1—1$^a$ respectively so as to move up and down. These carriers 3—3$^a$ are slotted to receive the saw blade 2, the upper end of each slot in each carrier being widened to receive the saw back 2$^a$. Thus far the parts described are well known and need no further detailed specification.

4—4$^a$ are buffer springs arranged in this instance upon the guide rods 1—1$^a$ underneath the carriers 3—3$^a$, whereby when the later descend suddenly, their force will be checked. These buffers 4 are so positioned relatively to the normal resting place of the saw when it is down that its edge will lie close to the work supporting table (not shown) of the miter box, which, it may be stated, is approximately the position indicated in dotted lines Fig. 2. The saw guides 1—1$^a$ are provided respectively with appropriate latches, to support the saw carriers and the saw in an elevated position well above the miter box table, when it is not desired to use the saw, thus permitting the operator to freely use both hands in either adjusting the saw guides to the proper position relatively to the table or to permit him to freely insert a new block of wood to be sawed. In the particular form shown, the guides 1—1$^a$ are connected at their upper ends by a bar 5.

I will now proceed to describe the latch construction.

6 is a latch adapted to the upper end of the front guide rod 1. This latch is pivoted at 7 and carries the depending hook 6$^a$ and a latterly extending operating shoulder 6$^b$. As shown, the latch 6 operates by gravity to throw the hook into its engaging position, wherein the hook 6$^a$ will engage under a shoulder 8 at the upper end of the carrier 3. As shown in Fig. 1, the hook 6$^a$ has just been freed from said shoulder 8 by reason of the engagement of a trip 9 which may be carried by the saw back 2$^a$. When the saw is advanced to the position shown in Fig. 1, the trip 9 strikes the latch 6 a glancing blow and releases the same from the holding position, freeing the carrier 3 so that it may descend by gravity to the position indicated in Fig. 2 and beyond. 10 is the second latch carried by the upper end of the guide rod 1$^a$ pivoted at 11 and provided with a hook 12 and an operating arm 13. Gravity is sufficient to cause this latch to assume its normal operative position shown in Fig. 1. The operating end 13 stands in such a position that when the saw back 2$^a$ is tilted to the position indicated in Fig. 3, it will engage said operating end and tilt the latch to the position indicated in said Fig. 2, thereby freeing the hook 12 from the locking shoulder 14 of the carrier 3ª, whereupon that carrier and the adjacent part of the saw may descend by gravity to the work.

The trip 9 is usually placed at any point on the saw back conveniently near the saw handle 2ᵇ, or in such a position that when the saw is pulled back slightly, it will be out of the way of the operating end of the latch 6, thus permitting said latch to assume its normal locking position. If at this time the saw and the carriers 3—3ª are elevated, the latches 6—10 will operate to engage the respective carriers 3—3ª and hold the saw elevated. When the operator is ready to use the saw, he grasps the handle 2ᵇ in the usual manner, advancing the same. The trip 9 strikes the latch 6 automatically releasing the same, whereupon that end of the saw drops and the forward end of the saw engages the latch 10, freeing it in turn, permitting the forward end of the saw to drop. It will thus be seen that the operator may without any special manipulation or shifting of his hand release the saw from an elevated position and allow it to swing or drop to the cutting position. By this very simple arrangement, very great advantages are gained, particularly in labor saving, for, as will be apparent, much time is saved the operator, who is free to use both hands in adjusting the new work or in adjusting the various parts of the miter box. It should be understood, of course, that the particular form of latch construction as well as the trip may be modified in a variety of ways so long as the construction is such that there is a coöperation between the saw and the latches, whereby the mere movement of the saw may be relied upon to automatically release the saw from its suspended position and permit it to descend. For example, the trip 9 might be made integrally with the saw or handle, although the adjustable form shown is preferable. In the particular form shown the trip is secured to the saw back by any suitable clamping device. The particular form of the hook-on or latch engaging means may also be very readily changed. The arrangement of the latch relatively to the support is such that no special trip is needed to limit the descent by gravity of the latch or to position it to be engaged by the carriers 3—3ª when the same are raised. The latches are arranged in an abnormally high position, and it merely requires the lifting up of the saw, which act raises the carriers until the latches snap into place and hold the parts elevated.

In the particular form shown herein, each carrier 3—3ª is composed of two semi-cylindrical sections held against independent vertical displacement by a transverse key-plate 3ᵇ arranged near the top of each section. The carrier sections are notched to receive said plate (see Fig. 3) and the locking shoulder 14, in this particular form shown, is a part of said plate, said plate being perforated for the passage of the hooked end of its coöperating latch, one end wall of said recess constituting said locking shoulder. This plate 3ᵇ in reality is a part of the carrier. This construction likewise may be modified in a variety of ways.

What I claim is:

1. In a device of the character described, a saw guide comprising two guide members arranged to guide the saw in all of its movements, supporting means arranged to hold the saw in an elevated position and including a latch carried by each of said guides, one of said catches being tilting means carried by the saw to automatically release the tilting latch and comprising a trip arranged to strike said latch a glancing blow.

2. In a miter box saw guide, two guides spaced apart from one another, a saw, means including a tilting latch carried by each saw guiding means arranged to engage and hold the saw suspended in an elevated position and a trip mounted on the saw to automatically release said saw engaging means by a movement of the saw.

3. In a miter box saw guide, two saw guiding means spaced apart from one another, a saw guided thereby and movable up and down relatively thereto, two tilting latches arranged above the saw and operating to detachably hold the latter in an elevated position, means to release one of said latches by a substantially horizontal movement of the saw said means being arranged to tilt said latch by engagement therewith and means to release the other of said latches by a tilting movement of the saw relatively to a line intersecting both of said latches.

4. In a miter box saw guide, a support, two guiding devices, a saw guided thereby, a supporting means being carried by the guides above the saw and including two independent tilting latches spaced apart from one another, each latch including means for engaging and holding the saw in a suspended position and an operating arm, the operating arm of one latch being lifted by a movement of the saw in one direction, the operating arm of the other latch being lifted by the movement of the saw in another direction.

EDMUND A. SCHADE.

Witnesses:
W. J. WORAM,
I. W. CHAPMAN.